Sept. 29, 1959 L. E. DRUMMOND ET AL 2,906,025
APPARATUS FOR DETERMINING THE PERCENTAGE OF
RED CELLS IN A BLOOD SPECIMEN
Filed March 28, 1955
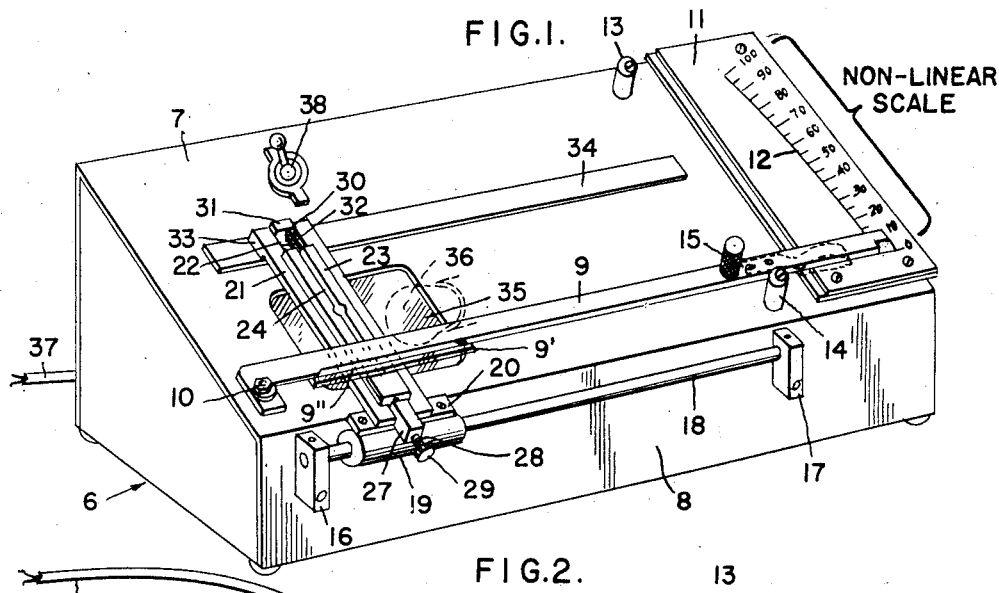
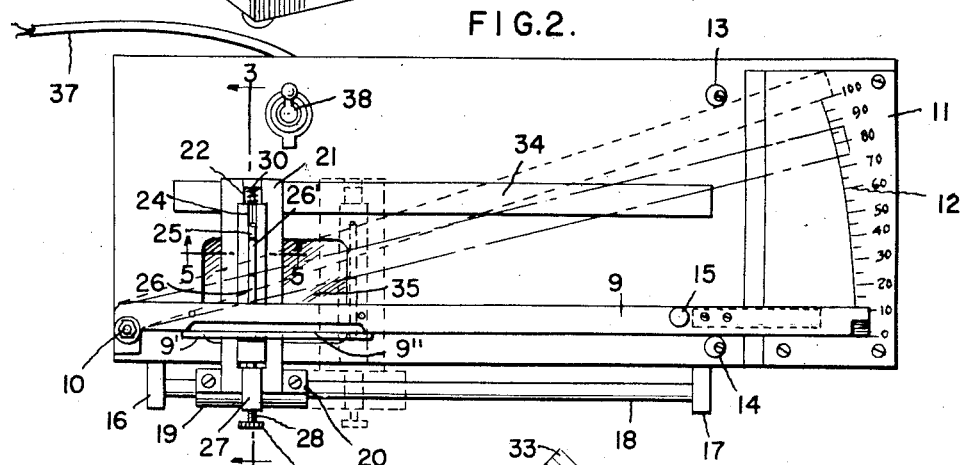
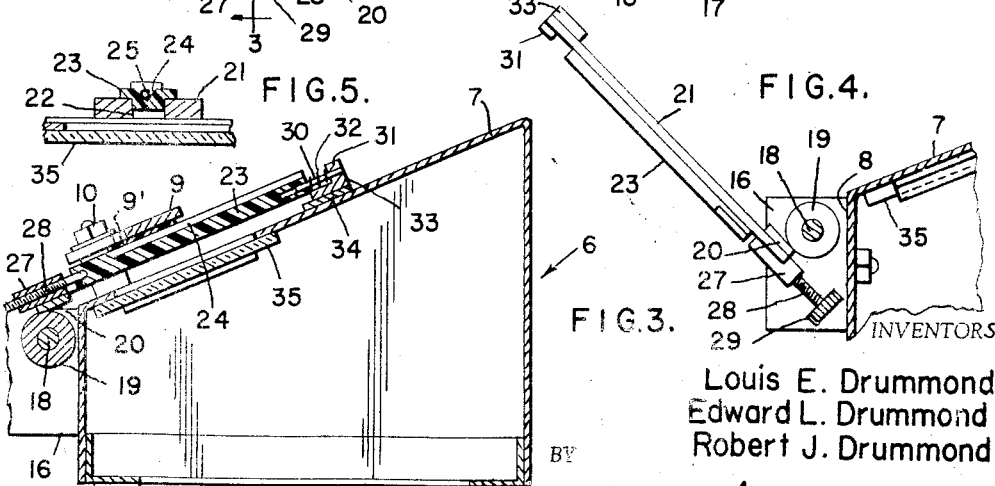
INVENTORS
Louis E. Drummond
Edward L. Drummond
Robert J. Drummond
ATTORNEY

2,906,025
APPARATUS FOR DETERMINING THE PERCENTAGE OF RED CELLS IN A BLOOD SPECIMEN

Louis E. Drummond and Edward L. Drummond, Havertown, and Robert J. Drummond, Drexel Hill, Pa.

Application March 28, 1955, Serial No. 497,158

9 Claims. (Cl. 33—75)

The present invention relates to an apparatus for determining the percentage of red cells in a blood specimen, being a continuation-in-part of our application, Serial Number 418,034 filed March 23, 1954 now Patent No. 2,840,915 granted July 1, 1958. The device of our parent application is now being extensively used and is a recognized achievement by those skilled in this art, especially when extreme accuracy in percentage determination of blood cells is necessary. It has been found, however, that the machine of the parent application is needlessly expensive where extreme accuracy is not necessary. Consequently much experimentation has resulted in a machine which will accomplish all of the objects of our original invention, with slightly less accuracy, although using a lesser number of parts in that, inter alia, microscopic and gauge assemblies are omitted, reducing the cost of manufacture to a fraction of the cost of our other machine.

An object of this invention is, the same as in the parent application, to provide a method and apparatus for rapidly determining the percentage of red cells in a blood specimen without measuring the height of the column of the specimen and the red cells and without mathematical computation, to a degree of accuracy sufficient for most blood tests.

A further object is to carry out the above stated object by use of a simpler more compact machine which employs fewer parts and may be operated by a person unskilled in this work, in view of the fact that only three simple mechanical operations are required after the tube has been positioned on the machine's stage.

Other objects of the invention will be apparent from the following description of the present preferred form of the invention, taken in connection with the accompanying drawings, wherein:

Fig. 1 is a perspective view of the machine of the present invention;

Fig. 2 is a top plan view of the same, showing in dotted lines positions assumed by the movable parts thereof in phases of the operational cycle;

Fig. 3 is a sectional view taken along the lines 3—3 of Fig. 2, looking in the direction of the arrows;

Fig. 4 is a fragmentary vertical sectional view showing in elevation the movable stage forming a part of the present invention in the tube discarding position; and Fig. 5 is a sectional view taken along the line 5—5 of Fig. 2, looking in the direction of the arrows.

Referring now in greater detail to the drawings, the device of the present invention comprises a support casing 6 having a canted top 7 and a front side 8. Mounted on top 7 is a gauge bar 9, a portion of which is cut away to receive a transparent member 9' on which is scribed a reference line 9" uniplanar with the front edge of bar 9. Member 9' facilitates the proper positioning of bar 9 during the operational cycle of the present device. One terminal of bar 9 is pivotally affixed to top 7 at 10, while the free terminal thereof is in operative engagement with a curved scale 11 secured to top 7 and having graduations 12 from zero to a hundred. Stops 13 and 14 are affixed to top 7 in spaced relation to control the extent of movement of bar 9 about pivot 10 from a lower limit of zero to an upper limit of one hundred (see Fig. 2). A knurled operating knob 15 facilitates movement of bar 9.

Mounted on front side 8 of the present machine in spaced relation to each other, are a pair of journal blocks 16 and 17 for supporting a rod 18. A sleeve 19 is slidably mounted on rod 18 to wihch sleeve is secured a mounting plate 20 for holding a stage 21. Stage 21 is provided with a central longitudinal opening 22 adapted for the reception of a specimen holder 23. Holder 23 is preferably made of a transparent plastic and has a central longitudinal groove 24 in which a centrifuged capillary tube 25 is placed. The blood specimen within tube 25 comprises red cells 26 and plasma 26'. Affixed to the lower terminal of stage 21 and within longitudinal opening 22 is a block 27 having a threaded axial bore in which a threaded shaft 28 operates. To the outer terminus of shaft 28 is affixed a knurled knob 29 for moving shaft 28 longitudinally with respect to block 27. The inner terminus of shaft 28 is juornaled in the lower extremity of specimen holder 23 as shown to advantage in Fig. 3. To the upper end of specimen holder 23 is attached a pin 30 which extends upwardly to a second block 31 secured to stage 21 within opening 22. Convoluted about pin 30 between specimen holder 23 and block 31 is a coil spring 32 adapted to exert a constant force on specimen holder 23 in the direction of block 27. Thus it will be seen that specimen holder 23 may be moved longitudinally in either direction with respect to stage 21 by the operation of knob 29.

Stage 21 is thickened at its upper end as indicated at 33 to engage a wear strip 34 affixed to top 7 which strip is parallel to and coextensive with rod 18.

In order to provide maximum visibility, a portion of top 7 is cut out beneath stage 21 and specimen holder 23 in which opening is set a translucent member 35 beneath which is an incandescent light 36 connected by conductor 37 to a power source. A switch 38 mounted on top 7 actuates light 36.

In use, capillary tube 25 is placed on specimen holder 23 and gauge bar 9 set at zero. Knurled knob 29 is next rotated until reference line 9" coincides with the lower terminal of red cell column 26. Gauge bar 9 is then moved to its upper limit into engagement with stop 13 as shown in dotted lines in Fig. 2. Movable stage 21 is moved laterally to the position shown in dotted lines in Fig. 2 at which point reference line 9" intersects the bottom of the meniscus at top of plasma 26'. To obtain the percentage reading of red cells in the specimen, bar 9 is moved downward until reference line 9" intersects the top of red cell column 26. After the percentage reading has been made, bar 9 is moved to its upper limit and stage 21 moved laterally until sleeve 19 abuts journal block 17. By exerting a downward and inward force on knob 29, sleeve 19 is rotated about rod 18, until stage 21 assumes the position shown in Fig. 4. This permits capillary tube 25 to gravitate from its position on specimen holder 25 into any suitable container. The operator is thereby saved the time and trouble of removing the tube manually.

It should be noted that, since scale 11 is curved to facilitate reading, and the capillary tube is rectilinear, a slight error in the percentage reading will result unless a compensation factor is added. Therefore a scale which, instead of having equally spaced graduations, has graduations which progressively increase an infinitesimal amount from the bottom to the top of the scale, is employed to afford the greatest possible accuracy.

While a preferred embodiment of this invention has

What we claim is:

1. Apparatus, for determining the percentage of red cells in a blood specimen including a support rod, a rotatable stage adapted for the reception of a centrifugal capillary tube of blood, one terminal of said stage being sleeved on said rod, a gauge bar movably mounted across the stage, said stage and gauge bar being movable to extreme positions at which the gauge bar does not cross the stage, a graduated scale engaged by said gauge bar to permit determination of the percentage of red cells in the tube, the height of said scale corresponding to the distance between the lower and upper limits of movement of said bar, said stage being rotatable about said rod to remove the capillary tube of blood from the stage upon movement of the stage and gauge bar to extreme positions.

2. Apparatus for determining the percentage of red cells in a blood specimen including a rotatable stage, a holder adapted to receive a centrifuged capillary tube of blood mounted on said stage, a pivoted gauge bar movable in an arc across the tube between an upper and lower limit, means for moving said holder relative to the stage to locate the lower terminal of the blood specimen coincident with the lower limit of the gauge bar, said stage being movable to locate the upper terminal of the blood specimen coincident with the upper limit of movement of said bar, and a graduated scale engaged by said gauge bar to permit determination of the percentage of red cells in the tube, the height of said scale corresponding to the distance between the lower and upper limits of movement of said bar.

3. In an apparatus for the purpose described, a supporting casing having top and front walls, a rod extending along said front wall, a sleeve slidably and rockingly mounted on the rod, capillary tube supporting means connected to said sleeve and extending normally transversely of said top wall, said top wall having an opening therein provided with a translucent closure across which said tube supporting means extends, a gauge bar pivoted to the top wall adjacent one end thereof and extending across the tube supporting means, and a graduated scale mounted on said top wall and having the free end of the gauge bar extending thereover.

4. The apparatus of claim 3 wherein the tube supporting means includes an arm fixed at one end to the sleeve and provided with a longitudinal slot and a translucent tube holder slidably mounted in said slot.

5. The apparatus of claim 3 wherein the tube supporting means includes an arm fixed at one end to the sleeve and provided with a longitudinal slot, a translucent tube holder slidably mounted in said slot, and adjusting means carried by the arm and engaging the tube holder for effecting adjustment of the tube holder in the slot.

6. The apparatus of claim 3 wherein illuminating means for the translucent closure is provided within the casing.

7. The apparatus of claim 3 wherein said graduated scale is curvilinear and the graduations thereon progressively increase an infinitesimal amount from the bottom to the top of the scale to compensate for errors in the capillary tube readings due to variations in differences in the angular relationship between the tube and the reading edge of the bar.

8. Apparatus for determining the percentage of red cells in a blood specimen including a stage adapted for the reception of a centrifuged capillary tube of blood, a pivoted gauge bar movable in an arc across said tube between an upper and lower limit, a portion of said gauge bar being cut away to receive a transparent member having a reference line scribed thereon uniplanar with the front edge of the gauge bar to facilitate locating the lower terminal of the blood specimen concident with the forward edge of the gauge bar, means for adjusting said capillary tube of blood in a fore and aft direction to locate the lower terminal of the blood specimen coincident with the forward edge of the gauge bar, and a graduated scale engaged by said gauge bar to permit determination of the percentage of red cells in the tube, the height of said scale corresponding to the distance between the lower and upper limits of movement of said bar.

9. Apparatus for determining the percentage of red cells in a blood specimen including a stage, a tube holder adapted to receive a centrifuged capillary tube of blood mounted on the stage, spring means on said stage in tensioned engagement with the upper terminal of said tube holder for urging the latter downwardly with respect to said stage, an abutment block carried by said stage to limit the downward movement of said tube holder under the force of said spring means, said block being provided with a threaded axial bore, screw means threadedly engaged with the bore, the inner terminal of said screw means being adapted to engage said tube holder to move the latter upwardly against the tension of said spring means, a pivoted gauge bar movable in an arc across the tube between an upper and lower limit, said stage being movable to locate the upper terminal of the blood specimen coincident with the upper limit of movement of said bar, and a graduated scale engaged by said gauge bar to permit determination of the percentage of red cells in the tube, the height of said scale corresponding to the distance between the upper and lower movements of said bar.

References Cited in the file of this patent

UNITED STATES PATENTS

| | | |
|---|---|---|
| 581,472 | Shaver | Apr. 27, 1897 |
| 1,628,447 | Attaway | May 10, 1927 |
| 1,736,342 | Gichler | Nov. 19, 1929 |
| 2,078,138 | Hansen | Apr. 20, 1937 |
| 2,603,000 | Lanman | July 15, 1952 |

FOREIGN PATENTS

| | | |
|---|---|---|
| 937,335 | France | Mar. 8, 1948 |